No. 683,752. Patented Oct. 1, 1901.
D. F. HAGERTY.
CHURN.
(Application filed June 10, 1901.)
(No Model.)

Witnesses
F. E. Alden.
C. N. Woodward,

D. F. Hagerty, Inventor
by C. A. Snow & Co
Attorneys

THE NORRIS PETERS CO., PHOTO-LITHO., WASHINGTON, D. C.

UNITED STATES PATENT OFFICE.

DAVID FRANCIS HAGERTY, OF SPENCER, IOWA.

CHURN.

SPECIFICATION forming part of Letters Patent No. 683,752, dated October 1, 1901.

Application filed June 10, 1901. Serial No. 63,959. (No model.)

*To all whom it may concern:*

Be it known that I, DAVID FRANCIS HAGERTY, a citizen of the United States, residing at Spencer, in the county of Clay and State of Iowa, have invented a new and useful Churn, of which the following is a specification.

This invention relates to churns; and it consists in the construction, combination, and arrangement of parts, as hereinafter shown and described, and specifically pointed out in the claims.

Figure 1:
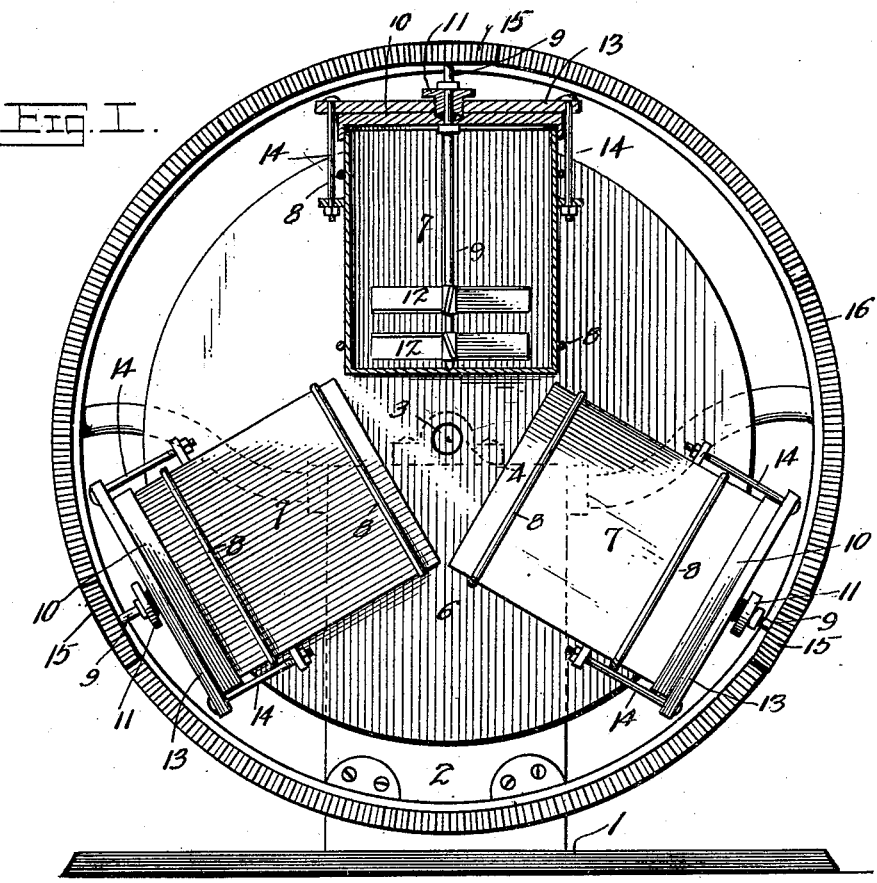
Figure 2:
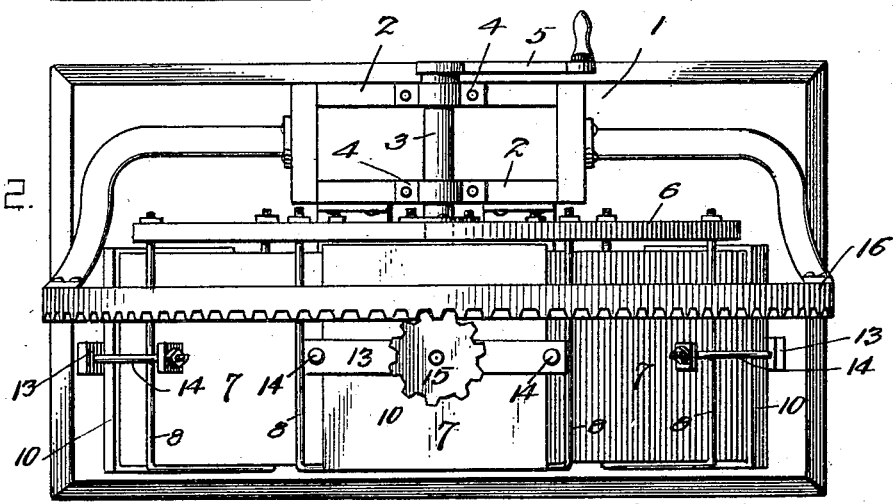

In the drawings, Figure 1 is a front elevation, and Fig. 2 is a top plan view, of the apparatus complete.

The base of the framework for supporting the apparatus is indicated at 1, with a standard 2 rising therefrom and supporting a horizontal shaft 3 in boxes 4 and having a crank-arm 5 on one end, by which it may be revolved. Mounted upon the other end of the shaft 3 and on the opposite side of the standard 2 from the crank 5 is a large disk 6, and attached to this disk at equal distances from its center are a series of churn-casings 7. The churn-casings will be connected rigidly to the disk, as by clips or straps 8, so that they will maintain their positions at all times equidistant from the center of the disk. As many of the churns may be arranged upon the disk as may be required; but generally three will be employed, as shown. Each churn-casing will be provided with a central shaft 9, each passing out through the outer end or cover 10 of its respective casing 7 and each shaft preferably suspended from its respective cover, and provided with suitable means 11 for "packing" where it passes through its cover. Upon each of the shafts 9 within its casing 7 are disposed paddles 12 of any approved form, so that each of the casings 7, its shaft 9, and paddles 12 form a complete churn. One of the casings 7 is shown in section to illustrate the internal construction; but it will be understood that each of the casings is constructed in the same manner internally. The covers 10 are each secured removably in any required manner, as by clamps 13, held in place by the bolts 14, as shown, so that the whole cover and its attached shaft and paddles can be removed bodily from its casing 7, and the casings 7 can be readily removed from the disk 6 by detaching the clips or straps 8. Upon the outer end of each shaft 9 is a spur-pinion 15, and upon the standard 2 is secured a stationary gear-rim or circular rack 16, adapted to engage all the pinions 15 as the disk 6 and its attached churns are revolved by the shaft 3. Thus motion is communicated to all the paddles in all the churns at the same time that the churns are revolved with the disk. Thus the cream is subjected to a double agitation as the motion is imparted to the apparatus. By this arrangement a series of independent churns are provided, that may each be charged with its own supply of cream and each treated independently and the product of each churn kept separate, if preferred. By the arrangement shown of the separate independent churns as many different qualities of cream as there are churns may be treated simultaneously and in the same period of time as one single lot. This is an important consideration where one or more lots of cream of different qualities occur and where it is desirable to "churn" them separately and keep the product of each lot distinct. Heretofore under such circumstances each separate lot had to be churned by itself and the time required multiplied by the number of lots, in addition to the time required to wash the churn between each churning; but with the arrangement shown no more time is required to churn all the different lots of cream than to churn one of them. By arranging the churns at equal points around a common center they balance each other, so that the power required to operate the apparatus is reduced.

What I claim as new is—

1. In a churn, a supporting means revolubly disposed, a series of independent churns connected to said supporting means, an independent rotary dasher disposed in each of said churns, means for revolving said supporting means, and means whereby the motion of said supporting means is simultaneously transmitted to said dashers to rotate the same, substantially as shown and described.

2. In a churn, a supporting-framework, a shaft revolubly supported upon said framework, a disk carried by said shaft, a series of independent churns removably connected to said disk at equidistant points thereon and provided with rotary dashers, and means for revolving said shaft and its attached disk and churns for rotating the dashers of the latter, substantially as shown and described.

3. In a churn, a supporting-framework, a shaft revolubly supported upon said framework, a disk carried by said shaft, a series of independent churns removably connected to said disk at equidistant points thereon, a dasher revolubly disposed in each of said churns, a pinion upon each of said dashers, a stationary gear-wheel disposed to engage all of said pinions, and means for revolving said shaft and its attached disk and churns, whereby said churns are revolved bodily around a common center and said dashers actuated simultaneously with the motion of said churns, substantially as described.

In testimony that I claim the foregoing as my own I have hereto affixed my signature in the presence of two witnesses.

DAVID FRANCIS HAGERTY.

Witnesses:
JAMES E. HAGERTY,
WILLIAM P. KELLY.